US006029957A

United States Patent [19]

Zysman

[11] Patent Number: 6,029,957

[45] Date of Patent: *Feb. 29, 2000

[54] MANUFACTURE OF POCKET SPRING ASSEMBLIES

[75] Inventor: Milton Zysman, Toronto, Canada

[73] Assignee: Furniture Row Technologies, LLC, Lakewood, Colo.

[ * ] Notice: This patent is subject to a terminal disclaimer.

[21] Appl. No.: 08/995,857

[22] Filed: Dec. 22, 1997

Related U.S. Application Data

[63] Continuation-in-part of application No. 08/500,904, Feb. 1, 1994, Pat. No. 5,699,998.

[51] Int. Cl.[7] .......... F16F 3/00

[52] U.S. Cl. .......... 267/89; 5/655.8

[58] Field of Search .......... 267/89, 91, 93, 267/94; 53/114, 115, 527; 5/655.7, 655.8

[56] References Cited

U.S. PATENT DOCUMENTS

| | | | |
|---|---|---|---|
| 1,370,533 | 3/1921 | Genge | 5/655.7 |
| 1,455,416 | 2/1923 | Shields | 5/655.7 |
| 1,733,660 | 10/1929 | Gail . | |
| 2,276,282 | 3/1942 | Bindszus . | |
| 2,747,346 | 5/1956 | Tigerman et al. . | |
| 2,951,322 | 9/1960 | McCorkle et al. . | |
| 3,168,792 | 2/1965 | Stumpf | 29/433 |
| 3,417,544 | 12/1968 | Grevich . | |
| 3,513,629 | 5/1970 | Hoagland et al. . | |
| 4,381,637 | 5/1983 | Ballestrazzi et al. . | |
| 4,401,501 | 8/1983 | Stumpf | 156/367 |
| 4,439,977 | 4/1984 | Stumpf | 53/428 |

*Primary Examiner*—Mark T. Le
*Assistant Examiner*—Pamela J. Lipka
*Attorney, Agent, or Firm*—Ridout & Maybee

[57] ABSTRACT

In the production of a pocket spring assembly, fabric is secured along multiple parallel seam zones so as to form a quilt defining a plurality of parallel fabric tubes connected to each other at uniformly spaced intervals. The tubes so formed are supported on guides extending longitudinally through the tubes, portions of the quilt are repeatedly drawn from the guides at their one ends and folds formed in each layer of fabric in the drawn off portion are secured to form pockets from the drawn off portions of the quilt, and precompressed coil springs are passed through the guides and released into the pockets between each drawing of the quilt, with their axes perpendicular to both the axes of the fabric tubes and the direction of advancement of the quilt, so that secured folds in the fabric of the tubes in front of and behind the released springs retain them in the pockets. The quilt may be formed either as a separate step, or in situ on the guide, and from separate superposed webs of fabric, or separate webs for each tube. The connections between the tubes preferably have a span perpendicular to the plane of the quilt which is similar to the span of the connections of the folds.

32 Claims, 7 Drawing Sheets

MANUFACTURE OF POCKET SPRING ASSEMBLIES

REFERENCE TO RELATED APPLICATION

This application is a continuation-in-part of my copending application Ser. No. 08/500,904 filed Feb. 1, 1994, now U.S. Pat. No. 5,699,998.

BACKGROUND OF THE INVENTION

1. Field of the Invention

This invention relates to pocket spring assemblies for cushions or mattresses, and to apparatus and methods for that manufacture.

2. Review of the Art

Pocket spring assemblies consist of two dimensional arrays of coil springs contained in individual fabric pockets. Such a construction, often known as the Marshall construction after its inventor, has for almost a century been regarded as providing a highly desirable level of cushioning performance, but usage of it has been limited because of its high cost of manufacture, involving as it does the formation of the fabric pockets, the insertion of the compressed springs and the assembly and securing of the properly oriented pocketed springs into a two dimensional array. Various efforts have therefore been made to facilitate the manufacture of such arrays, as will be found described for example in U.S. Pat. No. 4,234,983 (Stumpf) which itself represents what is believed to be the most commercially successful attempt to date to automate the construction of pocket spring assemblies. This patent discloses the production of endless strips of pocketed springs which can then be assembled into the desired arrays. Even so, such pocket spring assemblies remain costly compared to other assemblies, which whilst of lower cushioning performance, can be assembled in a more highly automated manner.

SUMMARY OF THE INVENTION

It is an object of the present invention to provide an improved technique for the production of pocket spring assemblies which can directly produce pocketed springs in a two dimensional array.

According to the invention in its broadest aspect, there is provided a method of producing a pocket spring assembly, comprising the steps of securing together webs of fabric along multiple parallel seam zones so as to form a quilt defining a plurality of parallel fabric tubes extending longitudinally of a plane of the quilt, adjacent tubes so formed having regularly spaced connections between them at spaced intervals longitudinally of the tubes, supporting the the formed tubes on guides extending longitudinally through the tubes, repeatedly drawing portions of the tubes forming the quilt from the guides at their one end, pinching layers of fabric in the upper and lower portions of the tubes in the drawn off portion to form folds extending oppositely out of the plane of the quilt at locations intermediate the connections between the tubes, seaming the folds by connections to form pockets in the drawn off portions of the quilt, and passing precompressed coil springs through the guides and releasing them into the pockets between each drawing of the quilt, with their axes perpendicular to both the plane of the quilt and the direction of advancement of the quilt, so that secured folds in the fabric of the tubes in front of and behind the released springs retain them in a two dimensional array of pockets with the axes of the springs perpendicular to the plane of the quilt. In a preferred arrangement, the connections between the tubes have a span perpendicular to the plane of the quilt similar to the spacing between the connections of the oppositely directed folds.

The above method permits a pocket spring assembly to be produced directly in an automated manner from fabric and coil springs. The securing together of the webs of fabric and the closure of the tubes may be performed by stitching, or by welding, or by fasteners. For forming the assembly, the quilt may either be preformed and transferred to and gathered upon the guides which are supported by a table for movement relative to a spring inserting machine, or it may be formed in situ directly on the guides. A spring dispensing unit, which receives springs from a coil forming machine, is aligned with the one end of each guide in turn and successively inserts compressed springs into the end of each guide. This results in a row of compressed springs already in the guide being advanced along the guide, causing a spring to be released at the other end of the guide into a portion of the associated tube which has been drawn from the guide and closed by the fastening of folds of the fabric to form a pocket, for example by welding or the application of fasteners. After a complete pass of the table relative to the spring dispensing unit, the tubes are drawn further off the guides so as to permit further closures of folds of the fabric to provide pockets to receive the next row of springs to pass through the guides. The spacing of the connections between the tubes permits better formation of pockets around the sleeves and can provide a convenient means of indexing the tubes as they are drawn off between insertion of each row of springs. If these connections have a span perpendicular to the plane of the quilt which is similar to the perpendicular spacing of the fold connections, the connections between a pocket and every adjacent pocket are more or less symmetrical, and the springs are supported in a stable manner, vertically within the pockets, so as to minimize interference between adjacent springs such as might cause noise during use of a mattress or cushion incorporating the assembly.

The invention also extends to apparatus for carrying out the method, and the products produced by it.

SHORT DESCRIPTION OF THE DRAWINGS

Figure 1:
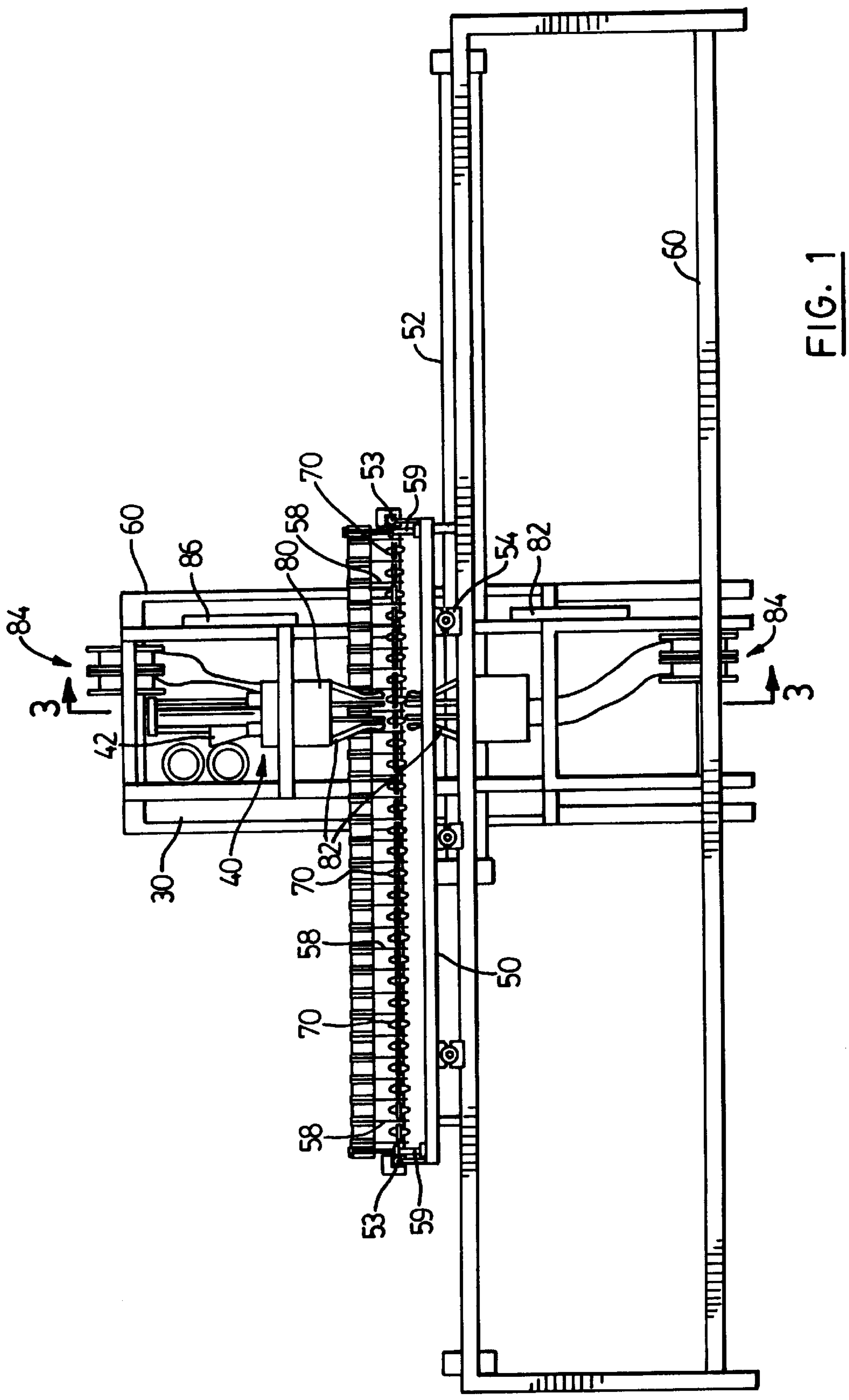
FIG. 1 is a front elevation of an apparatus for manufacturing pocket spring assemblies.
Figure 2:
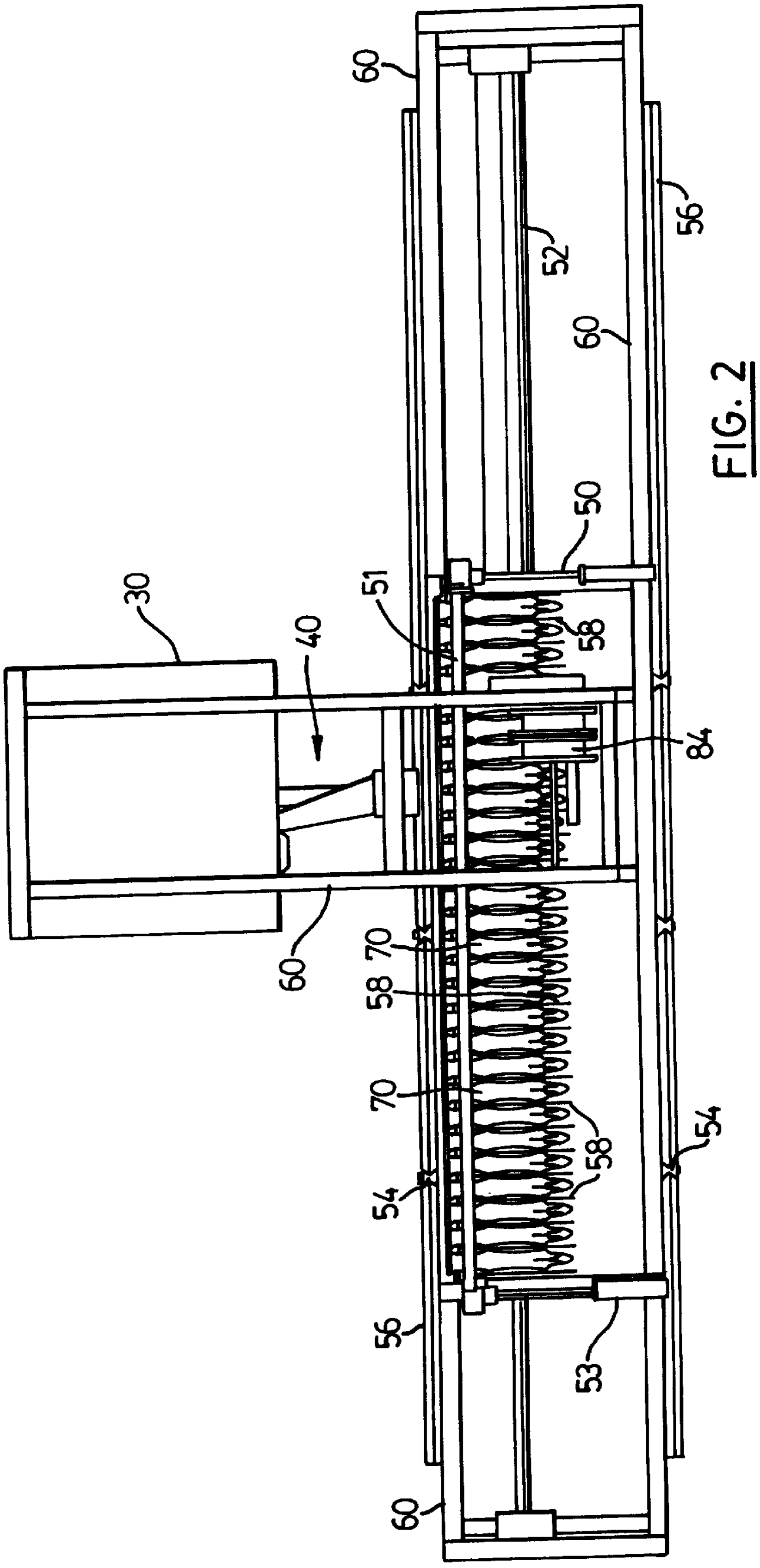
FIG. 2 is a plan view of the apparatus of FIG. 1.
Figure 3:
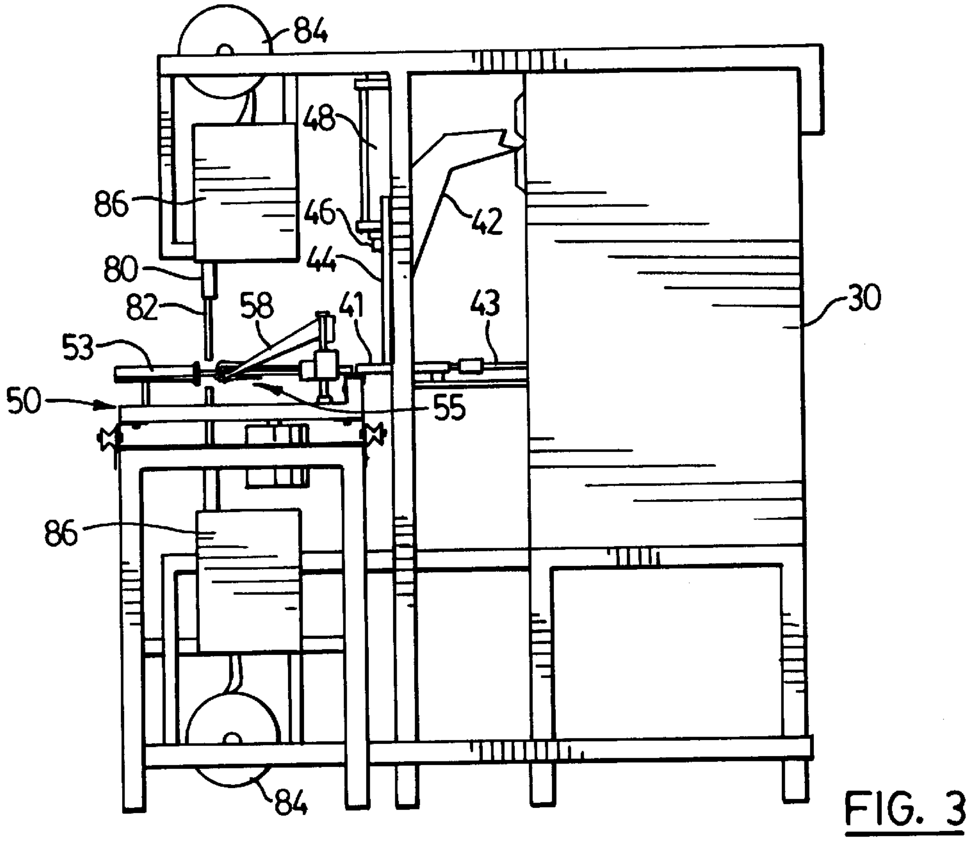
FIG. 3 is an end elevation of the apparatus of FIG. 1.
Figure 4:
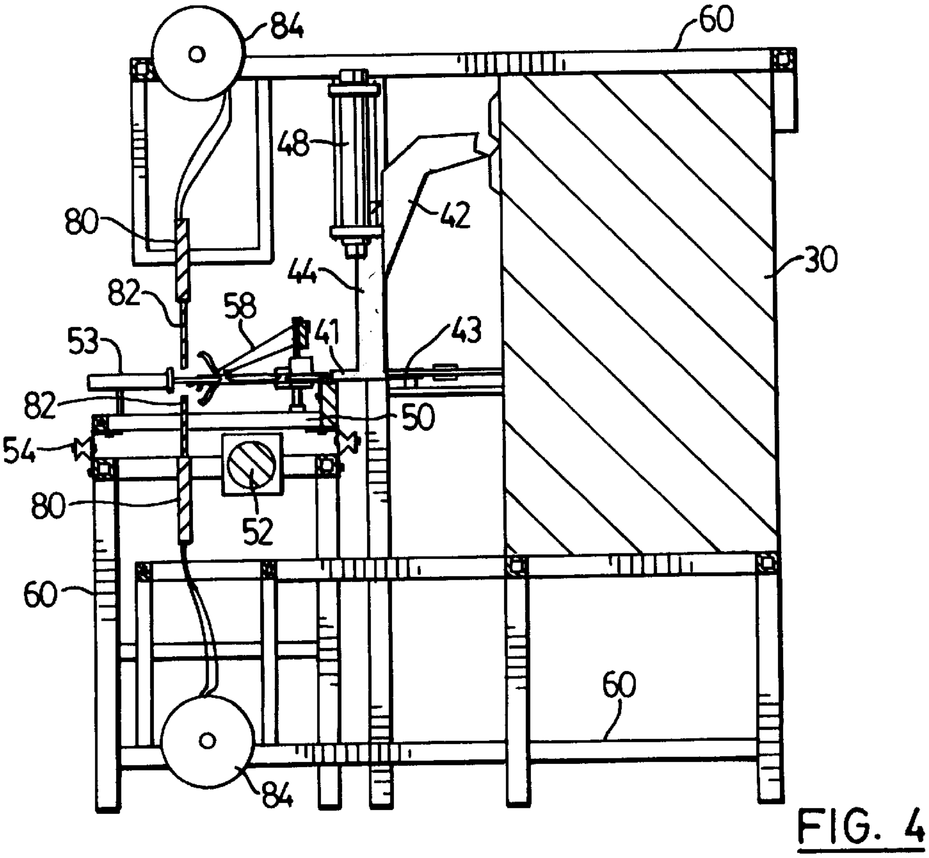
FIG. 4 is a vertical section through the apparatus on the line 3—3 in FIG. 1.
Figure 5:
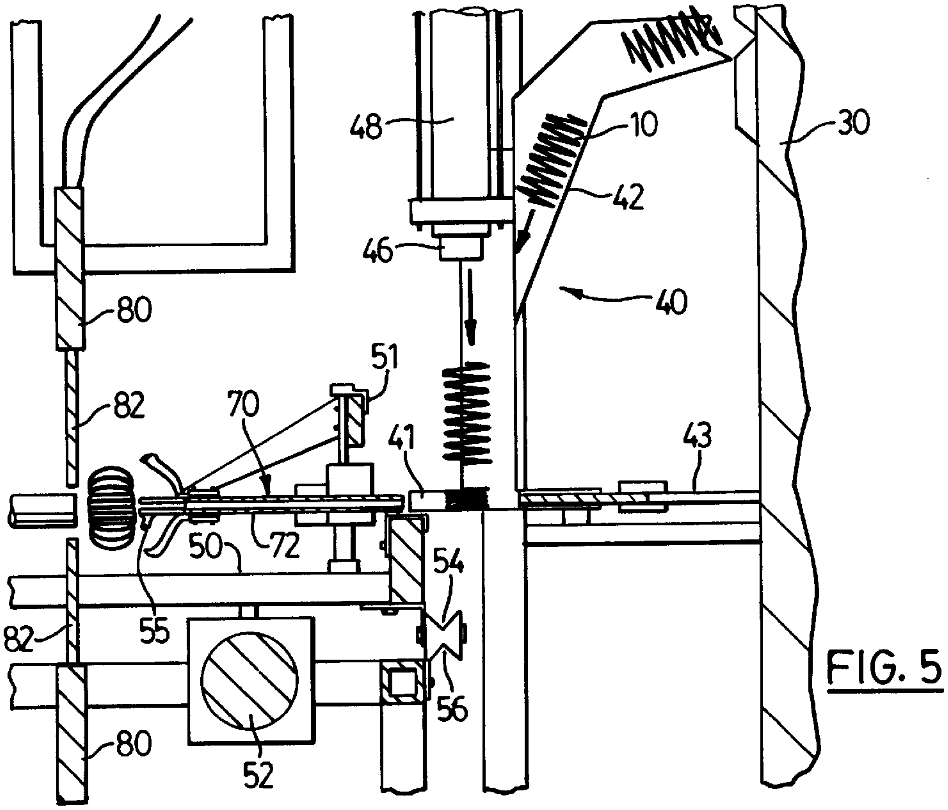
FIG. 5 is an enlarged view of a portion of FIG. 4.
Figure 6A:
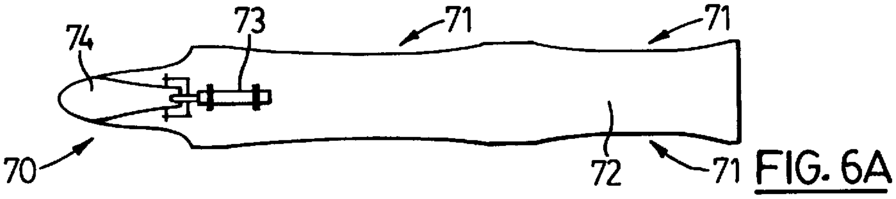
FIGS. 6A–6D are plan, side and end views, and an additional side view showing an open position, of parts of a spring insertion mechanism incorporated in the apparatus.
Figure 6C:
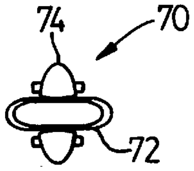
Figure 6B:
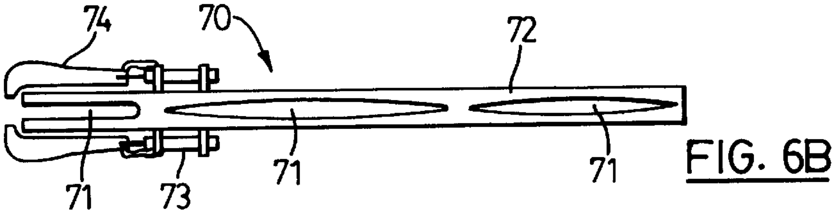
Figure 6D:
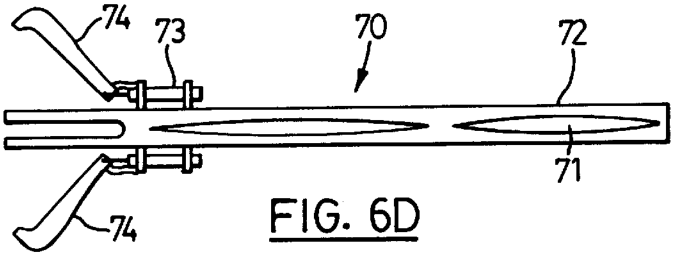
Figure 7:
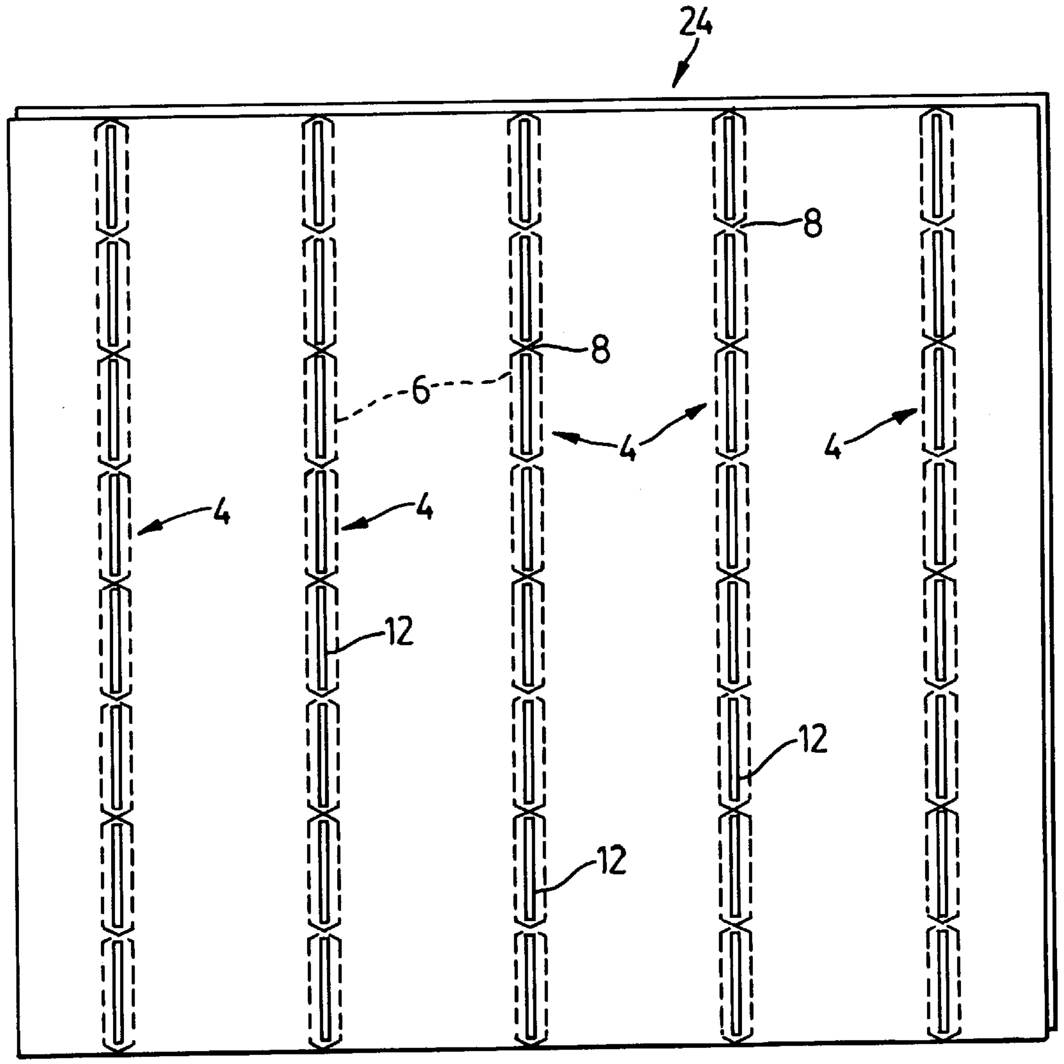
FIG. 7 is a plan view of a quilt utilized in the apparatus of FIGS. 1–6 in the manufacture of pocket spring assemblies.
Figure 9:
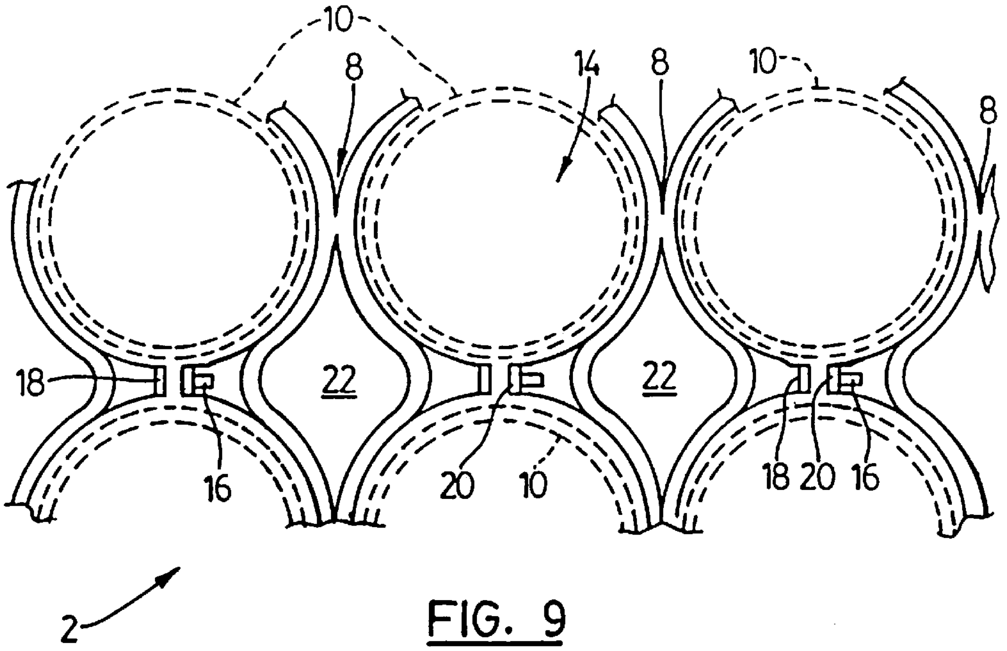
FIG. 9 is a fragmentary plan view of a completed spring assembly.
Figure 8:
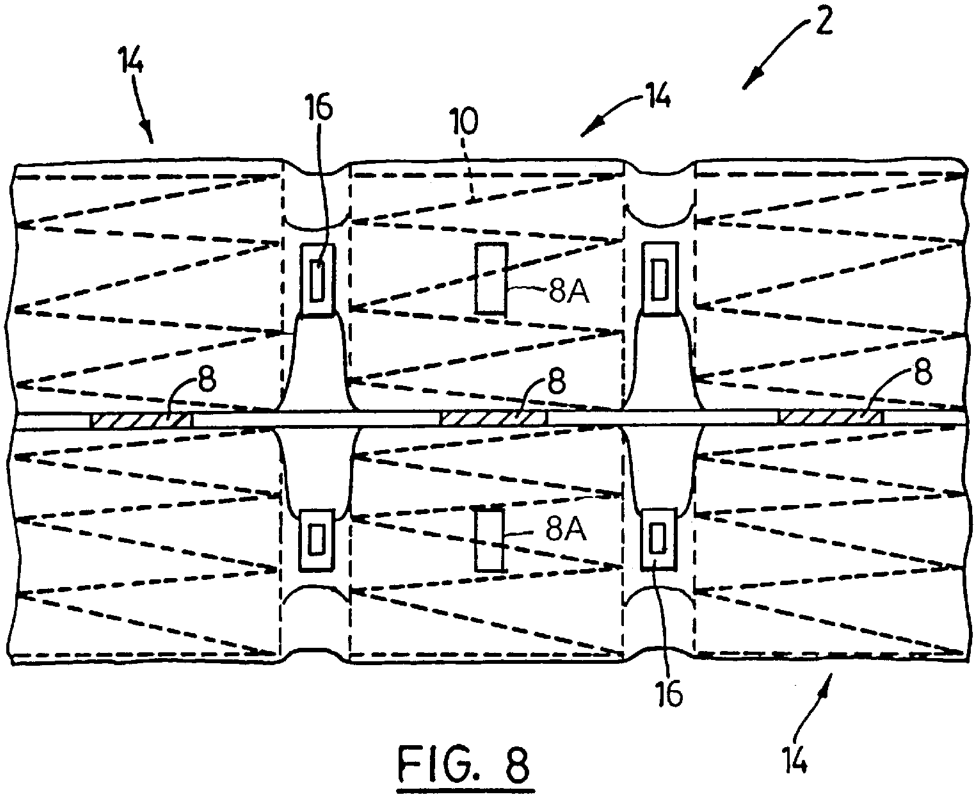
FIG. 8 is fragmentary longitudinal section of a completed spring assembly.

Referring first to FIGS. 7, 8 and 9, these illustrate the construction of a spring assembly 2 according to the invention. The assembly 2 is formed by inserting springs into a fabric quilt 24 which is shown formed in FIG. 7 by stitching together two layers of fabric, typically a non-woven synthetic fabric of a type conventionally used for enclosing pocket springs, along parallel spaced longitudinal zones 4. In the arrangement shown, there are two lines of stitching 6 in each zone, which have intersections 8 at intervals with a pitch somewhat greater than the intended pitch of the springs in the finished assembly. The zones 4 are spaced by a distance approximately equal to the sum of the pitch of the spring and the thickness of the finished assembly. Taking the two layers together, this provides an area of fabric, within each rectangle defined by an intersection interval and a zone spacing, sufficient to form a pocket 14 which can envelope a spring 10 within the assembly.

The fabric quilt of FIG. 7 is formed on a conventional multi-needle quilting machine, equipped with an intermittent slitting roller assembly at its exit to form slits 12 between each line of stitching 6 in each zone 4, the slits being interrupted in the vicinity of each intersection 8 to retain connections between portions of the quilt separated by the zones 4. These connections are reinforced by the stitching. Other forms of bonding of the layers of fabric could be used instead of stitching provided that seams and connections of sufficient integrity can be obtained, and other stitching patterns could be used provided that the slits 12 have a seam on each side between the layers of fabric. As described further below, it is presently preferred to form the quilt in situ on the same machine used to produce the spring assembly.

During assembly, and as discussed further below, a spring 10 is introduced into each pocket 14, a fold of the fabric in each layer is pinched together between adjacent springs in the longitudinal direction, to draw folds both above and below a horizontal centre line of the assembly out of a plane of the quilt, and the folds are then secured by a suitable form of fastening. This fastening may be a weld or staple, or other form of fastening. In the embodiments shown, a two-part positive fastening is used in which an enlarged head of a tongue 16 on one fastening member 18 engaging one side of the fold is positively secured in an opening in a second fastening member 20 engaging the other side of the fold. As seen in FIG. 8, the spacing between the fasteners above and below the plane of the quilt, in a direction parallel to the axes of the springs, is substantially less than the expanded length of the springs in the pockets. The presence of openings provided by the slits 12 between the connections formed at the intersections 8 permits the fabric to conform to and envelope the spring 10, leaving an aperture 22 between each adjacent group of four springs. The result is an integral pocket spring assembly in which adjacent spring pockets are connected by the fastened folds in the longitudinal direction, and the intersections 8 in the lateral direction. It will be appreciated that the size of the fabric quilt must be such as to provide sufficient pockets 14 in each dimension to provide an assembly of the desired size. As described further below, additional connections 8A may be provided above and below the connections 8, additional to or instead of the connections 8.

The springs are inserted into the quilt by the apparatus shown in FIGS. 1–6. The apparatus includes a spring making machine 30 which may be a conventional machine for forming coil springs from wire. Since its sole function is to provide springs for use by the rest of the apparatus, it could be replaced by a reservoir or magazine providing a source of springs, but integration of the spring making step into the apparatus is preferred and is particularly advantageous with the high capacity spring forming machines now becoming available.

A spring feeding assembly 40, discussed further below, feeds springs delivered by the machine 30 to spring insertion mechanisms 70 mounted on a moving table 50 supported on a machine frame 60 for lateral motion. A further laterally movable trolley (now shown) may be located in front of the frame 60, and can serve the dual purposes of preparing the quilt 24 for transfer to the table 50, and supporting a finished spring assembly as it is formed on the table.

The spring feeding assembly 40 has a chute 42 supported by the frame 60 which delivers successive springs emerging from the machine 30 into a vertical tube 44. Each spring 10 delivered into the tube 44 is compressed by a ram 46 of a pneumatic cylinder 48 so as to reduce its height to less than that of a passage 41 extending horizontally forward towards the table 50, so that a plunger 43 may project the compressed spring forwardly into the passage 41. The formation and ejection of springs by the machine 30, reciprocation of the ram 46, and movement of the table 50 are synchronized to provide delivery of compressed springs to successive spring insertion mechanisms 70. Depending upon the speed of the machine 30, it may be advantageous to provide more than one adjacent tube 44, ram 46, passage 41 and plunger 43, together with means associated with the chute 42 to direct springs into each of the tubes prior to each compression cycle, so as to speed up the rate of operation.

The insertion of a spring 10 into the passage 41 will result in a spring already in the passage being ejected into a rear end of a channel accumulator tube 72 (see FIGS. 6A–6D), or depending on the stroke of the plunger 43, the spring may be ejected directly into the tube 72. Each time a spring is inserted into a tube 72, the table 50 is indexed laterally to align a further assembly 70 with the passage 41. If there is more than one passage 41, the table is indexed a distance corresponding to the number of assemblies 70 being serviced simultaneously. When every assembly 70 has been serviced on one lateral pass of the table 50, a further pass is commenced, preferably with the table being indexed in the opposite direction rather than being returned to an opposite end of its stroke. This avoid unnecessary lateral movement of the fairly massive table 50, and of the spring assembly being formed. Indexing of the table 50 is performed by a cylinder 52 mounted on the frame 60, in association with limit switches and a brake, to control the indexing movement in known manner. The table is supported by rollers 54 engaging rails 56 secured to the frame 60.

An incidental advantage of the above arrangement is that the machine 30 or the feeding assembly 40 can include means for heat treating the springs, which then have ample time to cool before there is any possibility of their coming into contact with the quilt. This is in contrast with other automated systems for manufacturing springs and placing them in pockets, where special arrangements such as carousels and rapid forced cooling of the treated springs are needed to cool them sufficiently before they contact the fabric used to pocket them.

In addition to a row of the assemblies 70, mounted at a pitch equal to the lateral pitch of springs in the finished spring assembly, the table 50 also supports a row of pusher arms 58 mounted at a similar pitch on an actuating bar 51 so as to flank each assembly 70. The actuating bar is moved first forwardly and then rearwardly by cylinders 53 between each lateral pass of the table 50 so that fingers 55 on the ends of the arms can enter the slits 12 in the quilt 24, and engage a lateral row of intersections 8 to draw the quilt forwardly through a distance equal to the distance between successive intersections 8. As the arms are withdrawn, the fingers ride over the next row of intersections and engage the slits beyond, ready for their next forward stroke.

Mounted on the frame 60 above and below the table 50, and laterally in line with the (or each) passage 41, are fastener applying mechanisms 80 utilized to apply the fastening members 18 and 20. Each mechanism 80 has two adjacent applicator guns 82 so that it can apply fasteners to folds of fabric on either side of an assembly 70. The guns may either operate simultaneously between every other indexing movement of the table, or preferably the leading gun may be utilized in each direction of movement of the table to ensure that fasteners are applied in folds to each side of each mechanism 70. The fasteners are fed from reels 84, and the mechanisms 80 and guns 82 are controlled by control boxes 86. The guns may be replaced by applications for other forms of fasteners, or in a presently preferred arrangement, by welders having heated jaws to weld the fabric, which should be of a heat weldable type.

Each assembly 70 includes a flattened tube or guide 72 through which compressed springs from the passage 41 are advanced by one spring diameter each time a new spring is inserted into the passage 41, i.e. once for each pass of the table 50. In order to provide clearance between adjacent tubes 72 for the arms 58 without making the tubes so narrow as to promote jamming of the springs, portions of the horizontal side walls of the tube are cut away to form openings 71, which reduce the frictional engagement between the tube and the springs and provide clearance for the arms and for fabric gathered on the tubes. At a forward end of each tube 72 are pivoted upper and lower arms 74, actuated by small air cylinders 73 between extended (FIG. 6D) and retracted (FIGS. 6A–C) positions.

In use of this embodiment of the apparatus, a pre-prepared quilt 24 (see FIG. 7) is placed from the front on the tubes 72, so that a tube enters each tunnel formed by portions of the quilt between zones 4. The quilt is pushed as far onto the tubes as possible whilst the arms 58 are raised by cylinders 59 so that its material gathers on the rear portions of the tubes, and only a front edge of the quilt is pulled forward so that the fingers 53 of the arms 58 can engage the frontmost slit in each zone 4. Assuming that the tubes 72 are preloaded with springs, a pass of the table 50 is then run without inserting springs into the passages 41 so that the fastening mechanisms may apply initial fastenings to upper and lower folds of the fabric which are formed by opening the arms 74 on each tube 72. As an alternative, these fastenings could be applied before placing the quilt on the tubes 72. At the end of the this pass, the arms 58 are actuated by the cylinders 53 so as to advance the quilt a further one pitch beyond the ends of the tubes. If the tubes 72 are not preloaded, sufficient passes during which springs are fed should be run to achieve this condition.

On subsequent passes of the table, springs are loaded into the passages 42, with the result that springs are ejected from the tubes or guide 72 into the pockets formed by the quilt to the rear of the fastenings applied in the previous pass, and further pockets are formed, by the application of fastenings by the application guns 82, behind the springs during each pass, followed by further advance of the quilt by the arms 58 at the end of each pass. This continues until the spring assembly is completed. The completed portion of the assembly can be supported on the separate trolley previously mentioned, which can move sideways as required with the table 50: the stepping motion of the table will be smoothed out by the flexibility of the spring assembly. A row of horns on the trolley may also be used to prepare a quilt for mounting on the tubes 72 and to assist in transferring it to the tubes 72 by aligning the horns, which may be hollow tubes, with the tubes 72.

According to the capability of the spring forming machine 30, if it is programmable, it may be possible to alter the characteristics of springs inserted into different portions of the assembly, e.g. the side and centre portions of a mattress assembly. Alternatively, more than one machine 30 and feed assembly 40 could be provided to service separate insertion mechanisms 70 adjacent different zones of the table 50.

In a variation of the above described embodiment, the seams in the quilt may be bonded by welding rather than stitching, and the connections formed the fastener parts 16, 18 may also be produced by welds, or by one piece ties similar to the nylon ties widely used in tagging guns for attaching tags and labels to fabric articles, using a similar form of gun.

Although the embodiment of the invention described above utilizes a preformed quilt as shown in FIG. 1, an alternative embodiment utilizes a quilt which is formed in situ on the tubes 72 of the assemblies 70. In one such arrangement, the two layers of fabric for forming the upper and lower layers of the fabric tubes are drawn from rolls above and below the array of assemblies 70, and are secured together between the assemblies by head sealing and cutting tools acting from above and below between adjacent tubes 72.

In view however of the large degree of gathering of the fabric involved in forming it into adjacent tubes surrounding the assemblies 70, and the desirability of providing vertical extent to the connections 8, as discussed below, it is presently preferred to form the quilt in situ by using a separate web of material to form each tube.

Figure 10A:
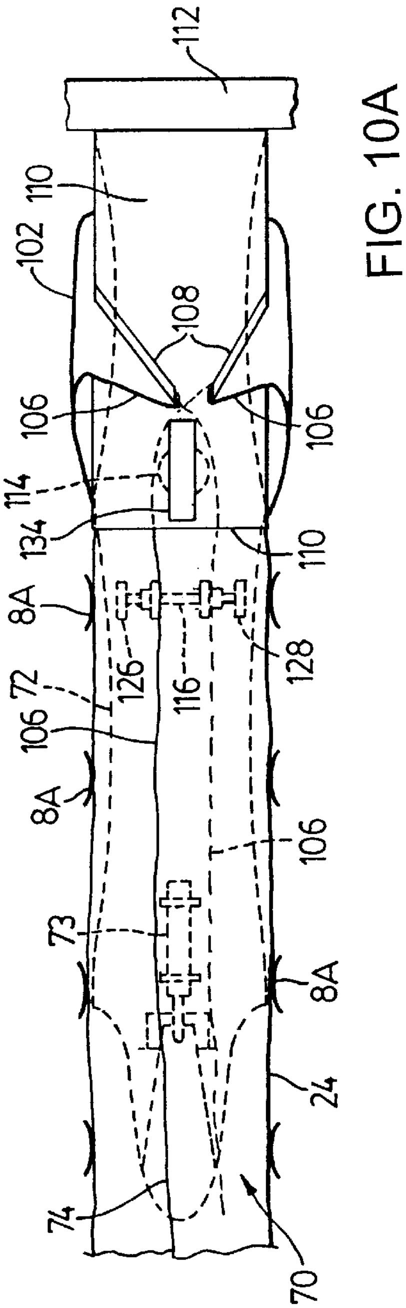
FIGS. 10A, 10B and 10C are plan, side elevational and end elevational detail views of a modification of the apparatus, with the fabric forming a tube of a quilt being shown in FIGS. 10A and 10B.
Figure 10B:
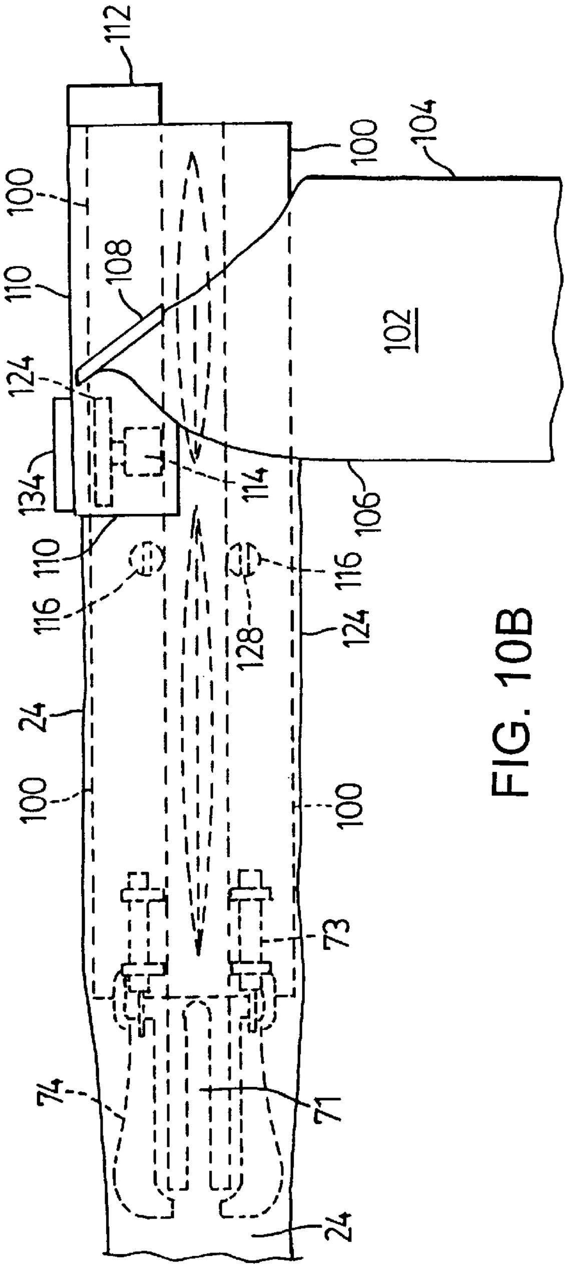
Figure 10C:
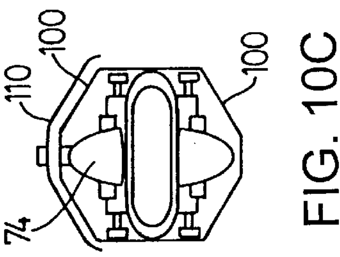

It has also been found that spring assemblies produced by the invention can permit such a high degree of independent motion of the springs that sufficient relative displacement of springs in adjacent rows can result in interference between coils of adjacent springs, causing undesirable noise as a user moves on a mattress or cushion incorporating the assembly. I have now found that this problem can be overcome by arranging that the connections 8 between adjacent rows of springs formed in adjacent tubes of the quilt have a significant vertical extent for example by providing fastenings 8A (see FIG. 8) between adjacent tubes above and below or in place of connections 8, so that the span of the connections between adjacent tubes in a direction perpendicular to the quilt is similar to the span of the fastenings 16 in the same direction. A modified assembly 70, which permits both in situ formation of the quilt, and the formations 8 of significant vertical extent, is shown in FIGS. 10A–10C in which like parts to those shown in FIGS. 1–6D are identified by the same reference numerals; indeed most of the differences involve added parts, namely members 100 forming a tubular sleeve surrounding each spring insertion mechanism 70 except for the slots 71 and providing a sleeve for supporting the quilt 24 which is formed in situ from plural webs of material 102 drawn from spools (not shown) located beneath the table 50. The webs are conveniently folded double on the spool and the spools are so oriented with their axes parallel to the tubes that each web moves upwardly towards the shell 100 and presents a fold 104 towards the rear of the machine. Forward edges 106 of the fabric 102 pass into diagonal slots 108 in a folding guide 110 which like the sleeve 100 is supported from a rear member 112 of the table 50. Pulling the quilt 24 forwardly over the sleeve results in the slots in the folding guide folding the fabric 102 around the sleeve so that the edges 106 overlap to form a tube. Within the sleeve 100, actuators 114 and 116, typically pneumatically operated, are provided carrying movable jaws 124, 126 and 128. The jaw 124 cooperates with a fixed jaw formed by an anvil 134 on the guide 110 to form longitudinal welds on the lapped edges 106 of the fabric web and thus seam it into a tube. The jaws 126 and 128 cooperate with corresponding jaws in an adjacent sleeve 100 so as to weld the fabric of adjacent tubes together at vertically spaced connections 8A, the spacing of which is similar to that of the connections formed in the folds of the upper and lower layers of fabric of each tube to separate springs in the tubes. In this embodiment, it is preferred that the fastener guns 80 be replaced by welding mechanisms with actuators and jaws similar to those described above. Rather than providing one or more travelling mechanisms to fasten the folds, pairs of welding jaws and actuators may instead be associated with each assembly 70, mounted above and below the outer ends of the tubes 72. This enables a long welding cycle to be provided between each draw of the quilt 24 for all of the welding mechanisms used, in each of which the jaws may be closed against each other through the two layers of fabric to be welded, a heating element associated with at least one of the jaws may be activated to fuse the fabric material, and the jaws may then remain closed with the heating element deactivated while the weld sets. The time available for this cycle is that required to insert a complete row of springs so that there is ample time to set the welds before they are subjected to stress.

It will be noted that with this modification there will be connections 8A formed by the welds between each pocket and an adjacent pocket, each having an approximately equal span. Between pockets lengthwise of the tube, the welds securing the folds will provide a connection having a substantial span extending above and below a centre plane of the quilt, and the connections 8A between the tubes of the quilt formed in situ on the assemblies 70 will have a similar span. The span of these connections, which is of course considerably less than the height of a spring expanded within a pocket, and even less than the free height of a spring, is sufficient to provide adequate connection between adjacent pockets to maintain spring orientation in the pockets sufficiently to prevent inter-spring interference, without prejudicing the independent compressibility of the springs which is a feature of pocket spring mattresses.

Since the length of the assembly that can be produced when the quilt is formed in situ is limited only by the length of fabric on the rolls from which the webs 102 are fed, it will usually be desirable to provide for cutting the quilt when an assembly of sufficient length has been formed. This may be achieved by running a pass of the apparatus with the spring feed disabled so as to produce a row of empty pockets through which the cut may be made.

It will be appreciated that the embodiments described above are exemplary only, and modifications of the method and apparatus are possible with the scope of the appended claims.

I claim:

1. A method of producing a pocket spring assembly, comprising the steps of securing together webs of fabric along multiple parallel seam zones so as to form a quilt defining a plurality of parallel fabric tubes extending longitudinally of a plane of the quilt, adjacent tubes so formed having regularly spaced connections between them at spaced intervals longitudinally of the tubes, supporting the formed tubes on guides extending longitudinally through the tubes, repeatedly drawing portions of the tubes formed by the quilt from the guides at their one end, pinching layers of fabric in upper and lower portions of the tubes in the drawn off portion to form folds extending oppositely out of the plane of the quilt at locations intermediate the connections between the tubes, securing the folds by connections to form pockets in the drawn off portions of the quilt, and passing precompressed coil springs through the guides and releasing them into the pockets between each drawing of the quilt, with their axes perpendicular to both the plane of the quilt and the direction of advancement of the quilt, so that secured folds in the fabric of the tubes in front of and behind the released springs retain a two dimensional array of pockets with the axes of the springs perpendicular to the plane of the quilt.

2. A method according to claim 1, wherein the quilt is preformed and placed on the guides as a preliminary step.

3. A method according to claim 1, wherein the quilt is formed in situ on the guides by forming thereon the tubes and the regularly spaced connections between them.

4. A method according to claim 3, wherein each tube is formed by wrapping a separate web of fabric around each guide, and the connections between the tubes are formed by securing the tubes so formed to one another between the guides.

5. A method according to claim 4, wherein the connections between the tubes are formed by welding using heated jaws associated with the guides.

6. A method according to claim 4, wherein each connection between the tubes has a span perpendicular to the plane of the quilt similar to the spacing between the connections of the oppositely directed folds.

7. A method according to claim 6, wherein the connections between the folds are formed by welds.

8. A method according to claim 6, wherein the connections between the tubes are formed by a pair of spaced welds.

9. Apparatus for producing a pocket spring assembly, comprising a row of parallel guides for receiving therearound tubes defined in a quilt formed by connecting webs of fabric along zones parallel to longitudinal axes of the guides with adjacent tubes so formed having longitudinally regularly spaced connections between them, mechanism to withdraw successive portions of the quilt from ends of the guides, mechanism to form successive connections securing folds formed in the fabric of the drawn off portions at regularly spaced locations longitudinally intermediate the connections between the tubes to form pockets and mechanism to dispense compressed coil springs through longitudinal passage in the guides into the pockets as they are formed, with the axes of the springs perpendicular a common plane containing the longitudinal axes of the guides.

10. Apparatus according to claim 9, wherein each guide is associated with folding elements to fold a web of fabric into a tube surrounding that guide as successive portions of the quilt are drawn from the guides, and fastening mechanisms to secure the tube so formed to establish longitudinally regularly spaced connections between the tube and tubes formed on adjacent guides.

11. Apparatus according to claim 10, wherein the fastening mechanisms establish connections having a span perpendicular to said common plane similar to a spacing perpendicular to said common plane of the connections of the folds.

12. Apparatus according to claim 10, wherein the fastening mechanisms are fabric welding devices.

13. A pocket spring assembly comprising a quilt formed from webs of fabric secured together along multiple parallel seam zones to form a plurality of fabric tubes with adjacent tubes so formed having regularly spaced connections between them longitudinally of the tubes, two layers of fabric forming each tube each being secured into a row of spaced folds by a plurality of connections regularly spaced in pairs along each fabric tube to form the fabric tubes into an array of pockets extending both longitudinally and laterally of the seam zones, and a coil spring extended within each pocket between connections to adjacent tubes with its axis perpendicular to a plane of the quilt, the connections in each pair securing the folds being located in opposite perpendicularly spaced directions out of the plane of the quilt and longitudinally intermediate the connections between the tubes.

14. A pocket spring assembly according to claim 13, wherein each fabric tube is formed by a separate web of fabric, and the tubes are connected together at spaced intervals to form said spaced connections.

15. A pocket spring assembly according to claim 14, wherein the connections between the tubes have a span in opposite perpendicular directions out of the plane of the quilt similar to a span in said opposite perpendicular directions of the connections of the folds.

16. A pocket spring assembly according to claim 13, wherein the connections between the tubes have a span in opposite perpendicular directions out of the plane of the quilt similar to a span in said opposite perpendicular directions of the connections of the folds.

17. A method for producing a pocket spring assembly, comprising:

providing a plurality of parallel guide members, each guide member having a longitudinal axis and a longitudinally oriented channel;

placing at least a portion of a section of tubular fabric over each of the guide members;

forming a closed segment at one end of each of the sections of tubular fabric;

securing together the tubular sections which are adjacent each other while the portions of the tubular sections remain over the guide members;

introducing compressed springs, the springs having a central axis about which they are coiled, through each of the channels with the central axis of each spring perpendicular to the longitudinal axis of the guide members, until they exit the guide members and expand within the tubular sections, with the closed segments being in front of each spring;

forming a closed segment behind each of the springs such that the springs are enclosed in fabric pockets.

18. A method as in claim 17, wherein the springs are introduced into the tubular sections after the tubular sections are secured together.

19. A method as in claim 17, further comprising advancing the sections of tubular fabric over the guide members and repeating the steps of introducing compressed springs through the guide members and forming closed segments behind the springs.

20. A method as in claim 17, further comprising welding the adjacent tubular sections at locations between the closed segments to secure the tubular sections together to form an array of springs enclosed in fabric pockets.

21. A method as in claim 20, further comprising welding the adjacent tubular sections from within the tubular sections.

22. A method as in claim 17, further comprising producing welds that are generally perpendicular to the longitudinal axis to form the closed segments.

23. A method as in claim 17, further comprising forming each tubular section from a single piece of fabric.

24. A method as in claim 23, further comprising welding two side edges of each piece of fabric together along a longitudinal line to form the tubular sections.

25. A method as in claim 24, further comprising welding the side edges together as the pieces of fabric are advanced over the guide members.

26. A pocket spring assembly formed according to the method of claim 17.

27. An apparatus for producing a pocket spring assembly, comprising:

a plurality of parallel guide members, each guide member having a longitudinal axis and a longitudinally oriented channel, wherein the guide members are each adapted to be received into at least a portion of a section of tubular fabric;

an advancement mechanism which is adapted to selectively advance the tubular fabric sections over the guide members;

a dispensing mechanism which is adapted to dispense compressed springs through the channels and into the tubular fabric sections, with a central axis of the springs being perpendicular to the longitudinal axis;

a connection mechanism which is adapted to produce closed segments in the tubular fabric sections to form a fabric pocket around each spring; and a fastening mechanism which is adapted to fasten adjacent tubular fabric sections and thereby form the pocket spring assembly.

28. An apparatus as in claim 27, further comprising a compression mechanism which is adapted to compress the springs.

29. An apparatus as in claim 27, further comprising at least one folding element associated with each guide member, wherein each folding element is adapted to form a piece of fabric into a tubular arrangement.

30. An apparatus as in claim 29, further comprising fabric welding mechanisms which are adapted to weld two ends of the pieces of fabric to form the tubular fabric sections.

31. An apparatus as in claim 27, wherein the connection mechanisms each comprise a pair of jaws to produce a weld in the tubular fabric sections generally perpendicular to the longitudinal axis.

32. An apparatus as in claim 27, wherein the fastening mechanism comprises welders to produce welds between the adjacent tubular fabric sections from within the tubular fabric sections.

* * * * *